United States Patent [19]

Crowe

[11] 3,779,916

[45] Dec. 18, 1973

[54] ACIDIZING COMPOSITION

[75] Inventor: Curtis W. Crowe, Tulsa, Okla.

[73] Assignee: The Dow Chemical Company, Midland, Mich.

[22] Filed: Nov. 4, 1971

[21] Appl. No.: 195,847

[52] U.S. Cl. ............................ 252/8.55 C, 166/307
[51] Int. Cl. ............................................. E21b 43/27
[58] Field of Search ................. 252/8.55 C, 8.55 D; 166/307

[56] References Cited
UNITED STATES PATENTS

| | | | |
|---|---|---|---|
| 3,353,603 | 11/1967 | Knight | 166/307 |
| 3,319,714 | 5/1967 | Knox | 166/307 |
| 1,922,154 | 8/1933 | De Groote | 252/8.55 |
| 2,802,531 | 8/1957 | Cardwell et al. | 252/8.55 X |
| 2,370,421 | 2/1945 | Reed | 252/8.55 |
| 2,999,812 | 9/1961 | Krahler | 252/8.55 |

Primary Examiner—Herbert B. Guynn
Attorney—William M. Yates et al.

[57] ABSTRACT

An acid-in-oil emulsion having a greatly enhanced retardation rate is prepared by employing in the emulsion a mixture of an effective amount of an oil wetting surfactant, e.g., a saturated hydrocarbon sulfonate, and an emulsifier, e.g., an alkylaryl sulfonic acid or water soluble salt thereof.

3 Claims, No Drawings

ACIDIZING COMPOSITION

BACKGROUND OF THE INVENTION

Calcareous formations are often treated with an acid to increase the permeability thereof. The rate at which the acid reacts with the formation is a function of various factors including; acid concentration, temperature, velocity, the particular type of calcareous material, and the surface area to acid volume ratio. In acid treatments of wells the acid can be pumped only a certain distance into the formation before the acid becomes spent. The time required for the acid to become spent is generally referred to as the reaction time. To more efficiently treat certain formations it is desirous to increase the reaction time of the acid. This is true for instance when the acid solution is to be employed to also fracture the formation.

One method employed in the art for extending the reaction time is to employ acid-in-oil emulsions, e.g., as taught in U.S. Pat. No. 1,922,154.

In another method the reaction rate of an acid is chemically retarded by incorporating into the acid certain oil wetting surfactants such as, for example, as taught in U.S. Pat. No. 3,319,714. In still another method a formation to be treated with an acid is first contacted with an oil containing an oil wetting surfactant, e.g., U.S. Pat. No. 3,343,602. Each of these methods have certain disadvantages associated therewith. For example, while the acid-in-oil emulsion generally gives greater reaction times than chemically treated acids the viscosity of the system is greater than the chemically treated acid and, therefore, the emulsion is more difficult to pump into the formation. Heretofore, no attempt has been made to combine a chemically retarded acid in an acid-in-oil emulsion because the oil wetting surfactants employed in the acid are generally considered to break acid emulsions. An acid-in-oil emulsion has now been discovered which contains a chemically retarded acid. The reaction time of the emulsion is greater than both chemically retarded acids and previously known acid-in-oil emulsions. Furthermore, the emulsion has a lower viscosity than previously known acid-in-oil emulsions.

SUMMARY OF THE INVENTION

A stable acid-in-oil emulsion having a high retardation rate and a relatively low viscosity is prepared by emulsifying together a hydrocarbon liquid, an acid, an oil wetting surfactant and an emulsifier.

DETAILED DESCRIPTION OF THE INVENTION

The oil wetting surfactant comprises a saturated hydrocarbon sulfonate having the general formula $RSO_3X$ wherein R is a $C_8$ to $C_{25}$ hydrocarbon (straight, branched or cyclic configuration) and X is an alkali metal or ammonia cation. The sulfonates can be made by methods well known in the art. For example, a saturated hydrocarbon (aliphatic or cycloaliphatic) of some predetermined chain length can be reacted with sulfur dioxide and chlorine in the presence of actinic light. Gamma radiation and/or certain catalysts can be substituted for actinic light. The so formed hydrocarbon sulfonyl chloride is neutralized with an alkali metal hydroxide or ammonium hydroxide to form the saturated hydrocarbon sulfonate. U.S. Pat. No. 2,999,812 cited in U.S. Pat. No. 3,319,714 teaches a method for preparing certain saturated hydrocarbon sulfonates which can be employed in the practice of the present invention. The teachings of these patents are specifically incorporated herein by reference. This oil wetting surfactant is soluble or at least slightly soluble in both aqueous acid solutions and liquid hydrocarbons.

The emulsifier comprises an alkylaryl sulfonic acid or water soluble salt thereof corresponding to the formula $R_1SO_3Y$ wherein $R_1$ is alkyl substituted benzene or naphthalene, wherein the alkyl group is $C_1$ to $C_{25}$, preferably $C_2$ to $C_{12}$ and Y is an alkali metal, hydrogen or ammonia ion. Fieser and Fieser, *Organic Chemistry*, page 588 to 589, 3rd Ed., 1957, discloses certain alkylaryl sulfonic acids and methods for their preparation. The teachings of Fieser and Fieser are specifically incorporated herein by reference.

Any liquid hydrocarbon generally employed in the art to prepare acid-in-oil emulsions can be employed. Liquids which can be employed include, for example, various grades of diesel oil, fuel oil, kerosene, gasoline, aromatic oils, petroleum fractions, mineral oils and various mixtures thereof.

Any water soluble acid generally employed in acidizing treatments can be utilized in the practice of the invention. Suitable acids include, for example, halogen acids, e.g., HCl, HF and HBr; mineral acids, e.g., sulfuric, nitric and phosphoric acid; organic acids such as acetic and proponic acid; modified organic acids such as chloroacetic acid and various mixtures thereof.

The liquid hydrocarbon oil phase can comprise, as percent by volume, from about 5 to about 95 percent, preferably from about 10 to about 50 percent of the emulsion.

The oil wetting surfactant, e.g., $RSO_3X$ as defined hereinbefore, and the emulsifier, e.g., $R_1SO_3Y$ as defined hereinbefore, are employed in an amount which is effective to prepare an emulsion which is sufficiently stable to provide an effective working time. The total quantity of both the oil wetting surfactant and emulsifier will depend on such factors as, the specific constituents of the emulsion, the specific oil-acid volume ratio, treatment temperature, etc. An amount of both ranging from about 0.02 to about 10.0 percent by weight, preferably from about 0.1 to about 1.0 percent, of the emulsion can be employed. The weight ratio of the oil wetting surfactant to emulsifier in the emulsion is not critical. A weight ratio of from about 5 to 1 to about 1 to 5 (oil wetting surfactant to emulsifier) is operable.

As an example of the method of preparing the emulsion 1,000 gallons of the emulsion were prepared in the following manner. First 300 gallons of kerosene are placed in a 1,000 gallon tank. To this are added, with mixing, 10 gallons of a solution containing about 20 percent by weight of an active long chain saturated hydrocarbon sulfonate, and one-half gallon of dodecylbenzenesulfonic acid as the emulsifier. To this are mixed 700 gallons of a 15 percent hydrochloric acid solution containing premixed therewith about 4 gallons of hexanol. Mixing is continued until the acid has been emulsified. The emulsion obtained is stable for an extended period of time and can be employed to acidize formations in a manner well known in the acidizing art.

Although specific quantities and particular ingredients are described it is understood that these may be varied to meet any particular desired situation to prepare emulsions within the scope of the present invention.

EXAMPLE 1

As an illustration the following tests were run to compare the reaction rate of emulsions within the scope of the present invention with other emulsions and chemically retarded acids which are presently employed in such treatments. The value $C_r$ shown in the following table is a classification parameter developed to provide a means of comparing the effectiveness of different retarded acids. The reaction rates are compared to a 15 percent unretarded HCl mixture, the reaction rate of the HCl mixture being equal to one. The higher the value $C_r$ the slower is the reaction rate of the retarded system.

The reaction rates of various retarded systems were determined in tests run in a dynamic control velocity acid cell. This cell comprises a rotating impeller which flows unspent acid past a coupon (exposed reaction face) at a constant lineal flow velocity of about 1 ft./sec. The cell is pressurized to 1,000 psi. The test coupons employed consisted of Alabama cream marble having a size of one-quarter inch thick by three-eighths inch wide, by 3½ inches long. In the test a certain acid formulation is flowed across four preweighed coupons for a certain length of time. After this the coupons are washed, reweighed and a mean weight loss of the four coupons is determined. The ratio of the weight loss of the mean of the four coupons to the loss employing 15% HCl gives a value of $C_r$. The variables of the test cell were held constant during this series of tests at the following values: velocity, 1 foot per second; pressure 1,000 psi; reaction time 10 minutes; temperature 80°F; acid strength 15% HCl. In all the tests a corrosion inhibitor was employed in an amount which did not drastically effect the stability of the emulsion employed. Kerosene was employed as the oil to prepare the emulsions. A mixture of a solution of 20 percent active long chained saturated hydrocarbon sulfonate and dodecyl benzene sulfonic acid was prepared having a volume ratio of the saturated sulfonate to benzene sulfonate solution of about 1 to 2 (Tests 1–4). Another emulsion was prepared containing a mixture of nonionic surfactants (imidizoline of fatty acid and diamine, salt of fatty acid and diamine and amide fatty acid and diamine) as an emulsifier (Test No. 5). In Test 6 a chemically retarded HCl as taught in U.S. Pat. No. 3,319,714 was employed. The RSO₃X compound was a $C_{13}$ sodium salt and was employed in an amount of about 1 percent by weight of acid.

TABLE I

15% HCl $C_r=1$

| Test No. | Per Cent by Wt. Emulsifier | Volume Ratio Acid to Oil | $C_r$ 15% HCl 1 |
|---|---|---|---|
| 1 | 0.8% mixture | 70:30 | 102.10 |
| 2 | 1.0% mixture | 70:30 | 226.60 |
| 3 | 8.0% mixture | 85:15 | 48.9 |
| 4 | 1.0% mixture | 85:15 | 34.8 |
| 5 | 0.4% mixture | 70:30 | 5.1 |
| 6 | chemically retarded acid | — | 34.2 |

EXAMPLE 2

In this example the viscosity of emulsions having various oil to acid ratios employing the oil wetting surfactant-emulsifier system of the present invention were compared to emulsions containing a nonionic emulsifier, such as taught in U.S. Pat. No. 2,681,889. The viscosities were determined employing a Model 35 Fann V–G Meter. After an emulsion was prepared it was placed in the viscometer and stirred at 600 rpm for 1 minute. Readings were then taken at 600 rpm, 300 rpm and 100 rpm speeds. The viscosity readings are set forth in the following Table II.

Each emulsion was prepared employing kerosene as the liquid hydrocarbon and 15% HCl as the acid solution. The emulsifiers were the same as employed in Example 1. In Test Nos. 1–4 the emulsifier of the present invention is demonstrated and Test Nos. 5–8, the second emulsifier described in Example 1, is employed. Each of the emulsions also contained a known corrosion inhibitor.

TABLE II

| Test No. | Volume ratio, acid:oil | 600 rpm Dial | 600 rpm Cps | 300 rpm Dial | 300 rpm Cps | 100 rpm Dial | 100 rpm Cps |
|---|---|---|---|---|---|---|---|
| 1 | 50:50 | 20 | 10 | 11.5 | 11.5 | 4.5 | 13.5 |
| 2 | 60:40 | 34 | 17 | 20 | 20 | 9 | 27 |
| 3 | 70:30 | 43 | 21.5 | 28.5 | 28.5 | 14 | 42 |
| 4 | 85:15 | 85 | 42.5 | 60 | 60 | 36 | 108 |
| 5 | 50:50 | 27 | 13.5 | 15 | 15 | 6 | 18 |
| 6 | 60:40 | 48 | 24 | 27 | 27 | 11 | 33 |
| 7 | 70:30 | 111 | 55.5 | 68 | 68 | 29 | 87 |
| 8 | 85:15 | | | | | 193 | 579 |

As evidenced by these tests as the volume ratio of acid to oil in an emulsion increases the viscosity of the emulsion also increases. However, the rate of increase of the viscosity emulsion of the present invention is much less than with the known emulsifier.

What is claimed is:

1. A method of acidizing an acid soluble formation with an acidic solution in which said formation is soluble wherein the normal reaction time of said acid is extended, comprising:

contacting said formation with an acid-in-oil emulsion containing a total of from about 0.02 to about 10 percent by weight of both a water soluble saturated hydrocarbon sulfonate and an alkylaryl sulfonic acid or water soluble salt thereof wherein the water soluble saturated hydrocarbon sulfonate corresponds to the formula RSO₃X wherein R is a $C_8$ to a $C_{25}$ aliphatic or cycloaliphatic group and X is an alkali metal or ammonia cation, and the alkylaryl sulfonic acid or water soluble salt thereof corresponds to the formula $R_1SO_3Y$ wherein $R_1$ is an alkyl substituted benzene or naphthalene wherein the alkyl group is $C_1$ to $C_{25}$ and Y is one alkali metal, hydrogen- or ammonia-cation and wherein the weight ratio of $RSO_3Y$ to $R_1SO_3Y$ ranges from about 5 to 1 to about 1 to 5 to increase the normal reaction time of said acid-in-oil emulsion.

2. A composition consisting essentially of:

an aqueous acid-in-oil emulsion wherein the oil phase comprises, as percent by volume of the total of both the aqueous acid and oil, from about 5 to about 95 percent and the aqueous acid phase comprises the balance said aqueous acid characterized as reacting with a subterranean calcareous formation, and a total of from about 0.02 to about 10 percent by weight of both water soluble saturated hydrocarbon sulfonate and an alkylaryl sulfonic acid or water soluble salt thereof wherein said saturated hydrocarbon sulfonate corresponds to the formula $RSO_3X$ wherein R is a $C_8$ to a $C_{25}$ aliphatic or cycloaliphatic group and X is an alkali metal or ammonia cation, and the alkylaryl sulfonic acid or water soluble salt thereof corresponds to the formula $R_1SO_3Y$ wherein $R_1$ is an alkyl substituted benzene or naphthalene wherein the alkyl group is $C_1$ to $C_{25}$ and Y is one alkali metal, hydrogen or ammonia cation and wherein the weight ratio of $RSO_3X$ to $R_1SO_3Y$ ranges from about 5 to 1 to about 1 to 5 to increase the normal reaction time of said acid-in-oil emulsion.

3. The composition of claim 2 wherein said oil phase comprises from about 10 to about 50 percent by volume of the total volume of said acid and said oil.

* * * * *